United States Patent
Udriste et al.

(10) Patent No.: US 11,524,784 B2
(45) Date of Patent: *Dec. 13, 2022

(54) VENTILATED SEAT ASSEMBLY WITH ACTIVE AIR FLOW

(71) Applicant: B/E Aerospace, Inc., Winston-Salem, NC (US)

(72) Inventors: Daniel I. Udriste, Winston-Salem, NC (US); Samantha L. Huckabay, Stillwater, OK (US); Peter A. Stahl, Winston-Salem, NC (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 679 days.

This patent is subject to a terminal disclaimer.

(21) Appl. No.: 16/527,838

(22) Filed: Jul. 31, 2019

(65) Prior Publication Data

US 2021/0031926 A1 Feb. 4, 2021

(51) Int. Cl.
*B64D 11/06* (2006.01)
*A47C 7/74* (2006.01)
*B60N 2/56* (2006.01)

(52) U.S. Cl.
CPC ...... *B64D 11/0626* (2014.12); *B64D 11/0647* (2014.12); *B64D 11/0693* (2013.01)

(58) Field of Classification Search
CPC .. B60N 2/5657; B60N 2/5628; B60N 2/5642; B60H 1/00285; A47C 7/74; A47C 7/744; A47C 21/044
See application file for complete search history.

(56) References Cited

U.S. PATENT DOCUMENTS 3,136,577 A * 6/1964 Richard .............. B60N 2/5692
219/217
4,031,579 A 6/1977 Larned
(Continued)

FOREIGN PATENT DOCUMENTS

EP 1723876 A1 11/2006
EP 3771643 A1 2/2021
(Continued)

OTHER PUBLICATIONS

Search Report for European Application No. 19215453.2 dated Feb. 3, 2021, 3 pages.
(Continued)

*Primary Examiner* — Shin H Kim
(74) *Attorney, Agent, or Firm* — Suiter Swantz pc llo

(57) ABSTRACT

A ventilated seat assembly with active air circulation including a structural frame element, a cushion assembly supported by the structural frame element, a perforated dress cover, a conduit network embedded in the cushion assembly configured to direct air to at least one target region of the cushion assembly, an air mover coupled in fluid communication with the conduit network, and a controller operable for activating the air mover to cause air to flow through the conduit network to the at least one target region. In operation, the controller activates the air mover to flow air, such as unconditioned air, through the conduit network to be released through the dress cover in the at least one target region.

16 Claims, 4 Drawing Sheets

(56) References Cited

U.S. PATENT DOCUMENTS

| | | | | |
|---|---|---|---|---|
| 4,923,248 | A * | 5/1990 | Feher | A47C 7/74 |
| | | | | 297/452.44 |
| 5,524,439 | A * | 6/1996 | Gallup | B60H 1/00478 |
| | | | | 62/3.61 |
| 5,626,021 | A * | 5/1997 | Karunasiri | B60H 1/00285 |
| | | | | 62/3.61 |
| 5,715,695 | A * | 2/1998 | Lord | B60H 1/00285 |
| | | | | 62/331 |
| 6,119,463 | A * | 9/2000 | Bell | B60N 2/5657 |
| | | | | 62/3.61 |
| 6,237,675 | B1 * | 5/2001 | Oehring | B60H 1/00285 |
| | | | | 219/202 |
| 6,273,810 | B1 | 8/2001 | Rhodes, Jr. et al. | |
| 6,869,140 | B2 | 3/2005 | White et al. | |
| 7,478,869 | B2 * | 1/2009 | Lazanja | B60N 2/5635 |
| | | | | 297/180.13 |
| 7,587,901 | B2 | 9/2009 | Petrovski | |
| 7,871,039 | B2 * | 1/2011 | Fullerton | B64D 11/0649 |
| | | | | 244/118.6 |
| 8,136,874 | B2 * | 3/2012 | Negrini | B60N 2/5692 |
| | | | | 297/180.11 |
| 8,672,411 | B2 | 3/2014 | Gomes et al. | |
| 9,914,540 | B2 * | 3/2018 | Laib | B64D 11/0649 |
| 10,414,302 | B2 * | 9/2019 | Petrovski | B60N 2/5685 |
| 10,589,647 | B2 * | 3/2020 | Wolas | B60H 1/00285 |
| 10,919,633 | B1 * | 2/2021 | Wilson | B60N 2/5628 |
| 11,084,404 | B2 * | 8/2021 | Gupta | B60N 2/5642 |
| 2004/0160092 | A1 | 8/2004 | Laib | |
| 2006/0273646 | A1 | 12/2006 | Comiskey et al. | |
| 2007/0158981 | A1 * | 7/2007 | Almasi | B60N 2/5614 |
| | | | | 297/180.12 |
| 2010/0038937 | A1 * | 2/2010 | Andersson | B60N 2/5657 |
| | | | | 297/180.14 |
| 2014/0239677 | A1 * | 8/2014 | Laib | B64D 11/0626 |
| | | | | 297/180.1 |
| 2015/0239566 | A1 * | 8/2015 | Laib | B60N 2/5642 |
| | | | | 297/452.42 |
| 2019/0047449 | A1 | 2/2019 | Fujii et al. | |
| 2021/0031926 | A1 * | 2/2021 | Udriste | B64D 11/0626 |
| 2021/0039791 | A1 * | 2/2021 | Wilson | B60N 2/5635 |

FOREIGN PATENT DOCUMENTS

| | | |
|---|---|---|
| EP | 3772432 A1 | 2/2021 |
| WO | 2008057962 A3 | 5/2009 |
| WO | 2017083308 A1 | 5/2017 |
| WO | 2018221422 A1 | 12/2018 |

OTHER PUBLICATIONS

Office Action in European Application No. 19215453.2 dated Jun. 17, 2022, 6 pages.

* cited by examiner

VENTILATED SEAT ASSEMBLY WITH ACTIVE AIR FLOW

BACKGROUND

Aircraft seating arrangements commonly include economy and premium seating classes. Economy seating classes are designed for economic and space efficiency to situate passengers in close proximity. Premium seating classes are designed for comfort and enhanced privacy. Features and amenities commonly found in premium seating classes are likely not found in economy seating classes due to cost and space constraints.

Seat construction is a primary differentiator among seating classes. While seats in premium seating classes are spaced and actuated for complex adjustment, economy class seats are typically configured with minimal backrest recline. In addition, premium class seats may be equipped with heating and/or cooling systems, while economy class seats suffer from trapped and stagnant air and consequential discomfort and overheating accompanying prolonged sitting in a constant sitting position. While attempts have been made to address seat ventilation issues, all such attempts to date have focused on premium class seat constructions and systems delivering conditioned air to the seat.

Accordingly, what is needed is a mechanically simple, robust and economical solution for ventilating a seat without significant modification to the existing seat construction, and without having to draw conditioned air from the vehicles air conditioning system.

SUMMARY OF THE INVENTIVE ASPECTS

To achieve the foregoing and other aspects, embodiments of the inventive concepts disclosed herein are directed to a ventilated seat assembly with active air circulation including a structural frame element, a cushion assembly supported by the structural frame element, a perforated dress cover positioned over the cushion assembly, a conduit network embedded in the cushion assembly configured to direct air to at least one target region of the cushion assembly, an air mover coupled in fluid communication with the conduit network, and a controller operable for activating the air mover to cause air to flow through the conduit network to the at least one target region.

In some embodiments, the cushion assembly is a backrest cushion including at least one of a spacer mesh component and a foam component, wherein the backrest cushion includes a lower target region near a lumbar region of the backrest and an upper target region near a headrest region of the backrest.

In some embodiments, the conduit network includes a first length of tubing extending from the air mover to the lower target region and a second length of tubing extending from the air mover to the upper target region, each of the first length of tubing and the second length of tubing having at least one opening for releasing region into their respective target region.

In some embodiments, the spacer mesh is positioned in the lower target region and in the upper target region and the foam is positioned outside of the lower target region and the upper target region.

In some embodiments, the assembly further includes at least one valve or baffle for controlling air flow through the first length of tubing and the second length of tubing.

In some embodiments, the conduit network includes one or more lengths of tubing routed from the air mover, along passageways defined in the structural frame element, and to a predetermined one of the at least one target region of the cushion assembly, each of the one or more lengths of tubing including openings for releasing air into their respective target region.

In some embodiments, the cushion assembly is a backrest cushion including at least one of a lumbar target region, a side bolster target region, and a headrest target region, and the conduit network includes at least one of a first conduit for delivering air to the lumbar target region, a second conduit for delivering air to the side bolster target region, and a third conduit for delivering air to the headrest target region.

In some embodiments, each of the first, second and third conduits includes a length of tubing having at least one opening positioned in a predetermined target region for releasing air into the predetermined target region.

In some embodiments, the air mover serves a single ventilated seat assembly and is positioned below or behind the structural frame element.

In some embodiments, the structural frame element is a seat pan, the cushion assembly is a seat bottom cushion, the cushion assembly includes a spacer mesh component in the at least one target region and a foam component outside of the at least one target region, and the conduit network includes at least one length of tubing embedded in the spacer mesh component and having at least one opening for releasing air into the at least one target region.

In some embodiments, the cushion assembly is sealed on at least one side facing away from a passenger contact surface of the cushion assembly.

In another aspect, the inventive concepts disclosed herein are directed to an aircraft passenger seat assembly including a backrest frame element supporting a backrest cushion assembly, a seat pan supporting a seat bottom cushion assembly, a first conduit network embedded in the backrest cushion assembly configured to direct air to at least one target region of the backrest cushion assembly, an air mover coupled in fluid communication with the first conduit network, and a controller operable for activating the air mover to cause air to flow through the first conduit network to the at least one target region.

In some embodiments, the assembly further includes a second conduit network embedded in the seat bottom cushion configured to deliver air to at least one target region of the seat bottom cushion assembly, wherein the second conduit network is coupled in fluid communication with the air mover and the controller is further operable for activating the air mover to cause air to flow through the second conduit network to the at least one target region.

In some embodiments, activation of the air mover by the controller causes air to flow through the first conduit network and the second conduit network simultaneously.

In some embodiments, each of the backrest cushion assembly and the seat bottom cushion assembly includes a spacer mesh component in its respective at least one target region and a foam component outside of its respective at least one target region.

In some embodiments, the backrest cushion assembly includes a lower target region near a lumbar region and an upper target region near a headrest region, and wherein the backrest cushion assembly includes a spacer mesh component in the lower and upper target regions and a foam component outside of the lower and upper target regions.

In some embodiments, the first conduit network includes one or more lengths of tubing routed from the air mover, along passageways defined in the backrest frame element, and to a predetermined one of the at least one target region of the backrest cushion assembly, and wherein the second conduit network comprises one or more lengths of tubing routed from the air mover, along passageways defined in the seat pan, and to a predetermined one of the at least one target region of the seat bottom cushion assembly.

In some embodiments, the backrest cushion assembly includes a lumbar target region, a side bolster target region, and a headrest target region, and wherein the first conduit network comprises a first conduit for delivering air to the lumbar target region, a second conduit for delivering air to the side bolster target region, and a third conduit for delivering air to the headrest target region.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
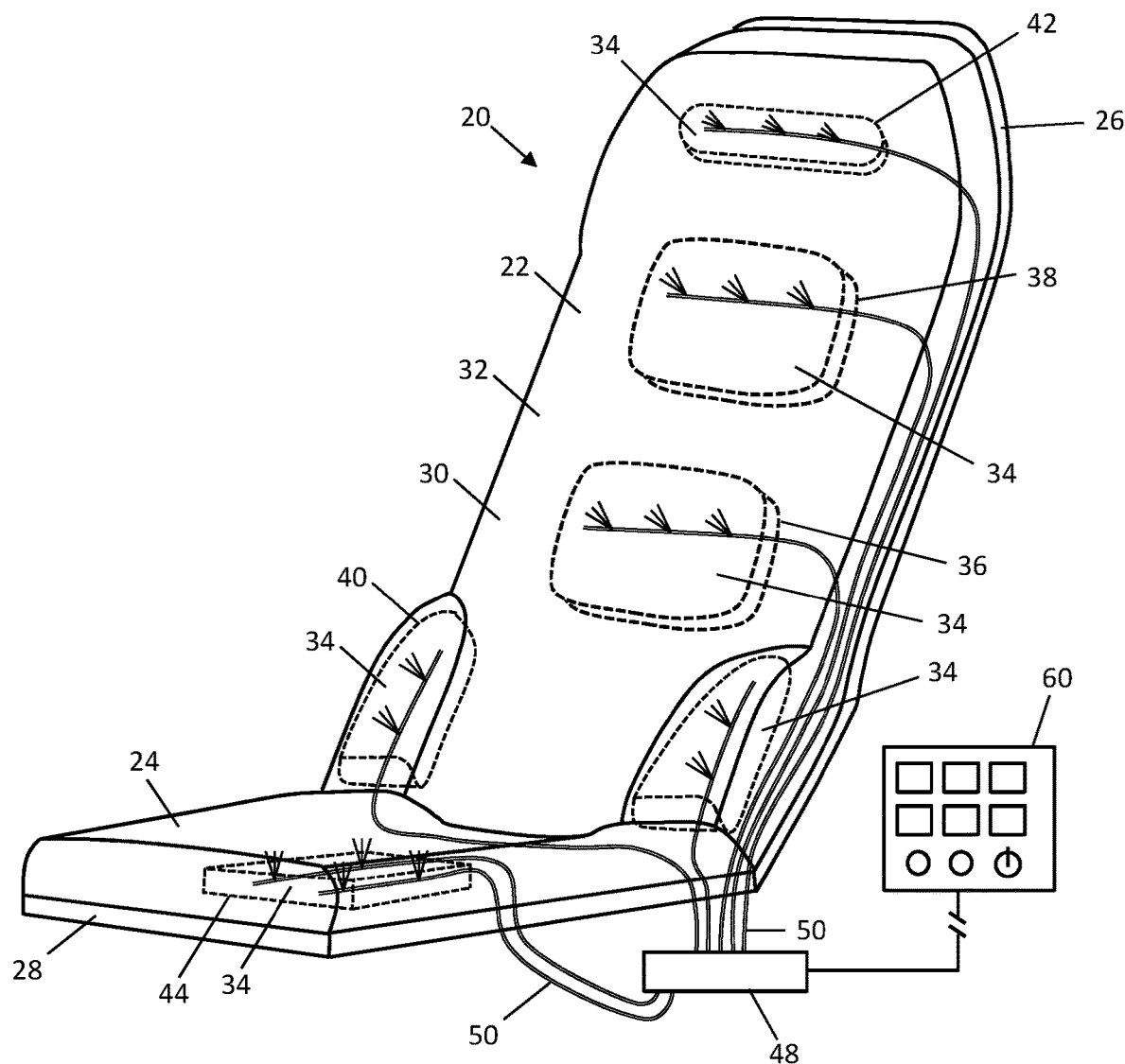
FIG. 1 is a perspective view of a seat assembly equipped with a seat ventilation system in accordance with an exemplary embodiment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Referring to the drawing figures, the inventive concepts disclosed herein are directed to passenger seat constructions including an integrated seat ventilation system for improving seat comfort, and particularly, preventing the build-up of trapped and stagnant heated air. The seat constructions disclosed herein are not limited to any seat type and therefore find widespread application in all types including premium and economy class seat constructions, among crew seats and other seat types. The ventilation systems disclosed herein can be integrated into the seat construction mutually exclusive of the adjustment and other capabilities of the seat. The ventilation systems according to the present disclosure can be incorporated into one or more of a backrest, seat bottom, headrest, armrest, and leg rest portions of a seat, as well as other furniture within the cabin environment.

The seat ventilation system generally operates to move unconditioned air through a particular cushion assembly to prevent air from becoming stagnant and warm after prolonged sitting. The system includes an air mover (e.g., fan, pump, blower, etc.) mounted below or behind the seat depending on space allowance. Each seat may be equipped with its own dedicated air mover electrically activated to flow unconditioned air through the system. As compared to conventional cushion assemblies constructed of open-cell foam and closed-cell flotation foam, the present cushion construction includes spacer mesh positioned in target regions corresponding to likely contact points with the seated passenger. Air conduit such as flexible tubing delivers unconditioned air to the spacer mesh in the target regions where the flowing air is released through a porous surface such as a perforated dress cover. In some embodiments, the spacer mesh may be sealed on sides facing away from the passenger such that air flow is directed, for example, out through the perforated dress cover.

Referring to FIG. 1, a non-limiting example of a seat assembly is shown at reference numeral 20. The seat assembly 20 generally includes a backrest cushion assembly 22 and a seat bottom cushion assembly 24. A backrest structural element 26 supports the backrest cushion assembly 22. A seat pan 28 supports the seat bottom cushion assembly 24. Each of the backrest structural element 26 and the seat pan 28 may be constructed from rigid materials such as composites to support their respective flexible cushion assembly. Each of the backrest cushion assembly 22 and the seat bottom cushion assembly 26 can be covered with a dress cover 30 for comfort, performance and aesthetics. As discussed further below, portions of the dress cover corresponding to target regions on the seat cushion assemblies are perforated to allow air to flow therethrough to the passenger.

The construction and configuration of the backrest structural element 26 and the seat pan 28 may vary. For example, the two components may be continuous across the respective back and bottom of the seat or may be skeletal elements supporting a diaphragm. The two components may be pivotally coupled such that the backrest can recline relative to the seat bottom. The components may be pivotally coupled to each other or to other frame elements such as seat spreaders. The inclination of the backrest may be adjusted and locked relative to the seat bottom. In an economy class seat construction, for example, a gas compression spring may act between the backrest and the frame and a button may be positioned in the armrest actuated to unlock the gas spring through a lever and Bowden cable arrangement, among other arrangements. In a premium class seat construction, a control panel may be electrically coupled to one or more seat actuators dedicated for driving component adjustability either alone or between discrete sitting positions. The ventilation systems disclosed herein operate mutually exclusive of a seat adjustment system.

Each of the backrest cushion assembly 22 and the seat bottom cushion assembly 24 may include more than one type of material in the cushion construction. In some embodiments, the cushion assemblies may include one or more layers of open-cell foam and closed-cell flotation foam with fire-resistant layers or additives, referred to herein collectively as the "foam" portion of the cushion assemblies shown generally at reference numeral 32. Cushion assemblies additionally include spacer mesh 34 positioned in predetermined zones of the cushion assembly referred to herein as "target regions" or "target zones." Spacer mesh may be a three-dimensional mesh like body attached to or affixed within the foam to prevent the spacer mesh from being displaced with respect to the foam body. In some embodiments, the spacer mesh is positioned in ventilated regions of the cushion assembly or the target regions, and the foam is positioned outside of the ventilated regions or target regions. While both the foam and spacer mesh provide comfort and support, the open-cell structure of the spacer mesh allows more air flow therethrough. Spacer mesh is positioned near or at the front of the cushion assembly in the case of the backrest, and near or at the top of the cushion assembly in the case of the seat bottom, in the target regions to direct air flow out through the perforated dress cover and across the passenger.

Target regions may correspond to likely points of passenger contact or likely pressure points. Regarding the backrest cushion assembly 22, target regions may be provided in one or more of a lower backrest or lumbar region 36, upper backrest region 38, side bolster regions 40, and headrest region 42. Regarding the seat bottom cushion assembly 24, a target region may correspond to a central region 44 of the seat bottom or other region. While the target regions generally correspond to passenger contact regions, target regions may also be positioned to one or more of the lateral sides and/or longitudinal ends in embodiments in which it is desired to move air through the cushion out the sides, top or bottom outside of the target areas. While the properties of the foam (e.g., polyurethane foam, soft synthetic resin foam, etc.) have better comfort performance as compared to the spacer mesh, the open-cell structure of the spacer mesh has better air flow performance as compared to the foam. Depending on the type of foam and spacer mesh, comfort differences between the two foam types may be imperceptible to the passenger, particularly when positioned beneath a seat dress cover 30. Each of the foam and the spacer mesh may be formed with contouring and concave portions to conform to passenger anatomy.

Portions of the spacer mesh adjacent the foam may be sealed to prevent air leakage. In some embodiments, the faces of the spacer mesh facing away from the passenger may also be sealed such that air contained in the spacer mesh is directed out through the unsealed face toward the passenger.

The seat construction 20 includes a ventilation system incorporated into one or more of the backrest cushion assembly 22 and the seat bottom cushion assembly 24. It is intended and understood that the seat assembly may include a ventilation system in one or more of the backrest and seat bottom, with additional systems optionally incorporated into the leg rest and arm rests where applicable. The multiple systems may be coupled and supplied by a single air mover assembly 48 for moving a volume of air through a conduit network(s). 50. The system may optionally include a manifold assembly, which may be a part of the air mover assembly 48. The manifold assembly is actuated to supply a flow of unconditioned air from the air mover assembly 48 to one or more of the air conduits depending on the selected target region to be ventilated.

The air mover assembly 48 may be positioned with the seat assembly, such as below the seat pan 28 or backrest structural element 26, or apart from the seat assembly. In the case of a manifold assembly, the manifold assembly may be part of the air mover assembly 48 or may be removed therefrom and coupled in fluid communication thereto via an air conduit. The air mover assembly 48 is activated and actuated to provide a flow of unconditioned air.

In the case of a manifold assembly, the manifold assembly generally operates to control and distribute air flow to the conduit network 50. The manifold assembly generally includes one or more outlet ports corresponding in number to the number of air conduits of the conduit network. For example, the outlet ports may include 1, 2, 3, . . . n number of outlet ports corresponding to 1, 2, 3, . . . n number of air conduits of the conduit network. Extra outlet ports may be included to allow for future expansion of the system. Quick connect fittings, threaded connections and the like may be used to attach the air conduits to the manifold assembly.

Figure 2:
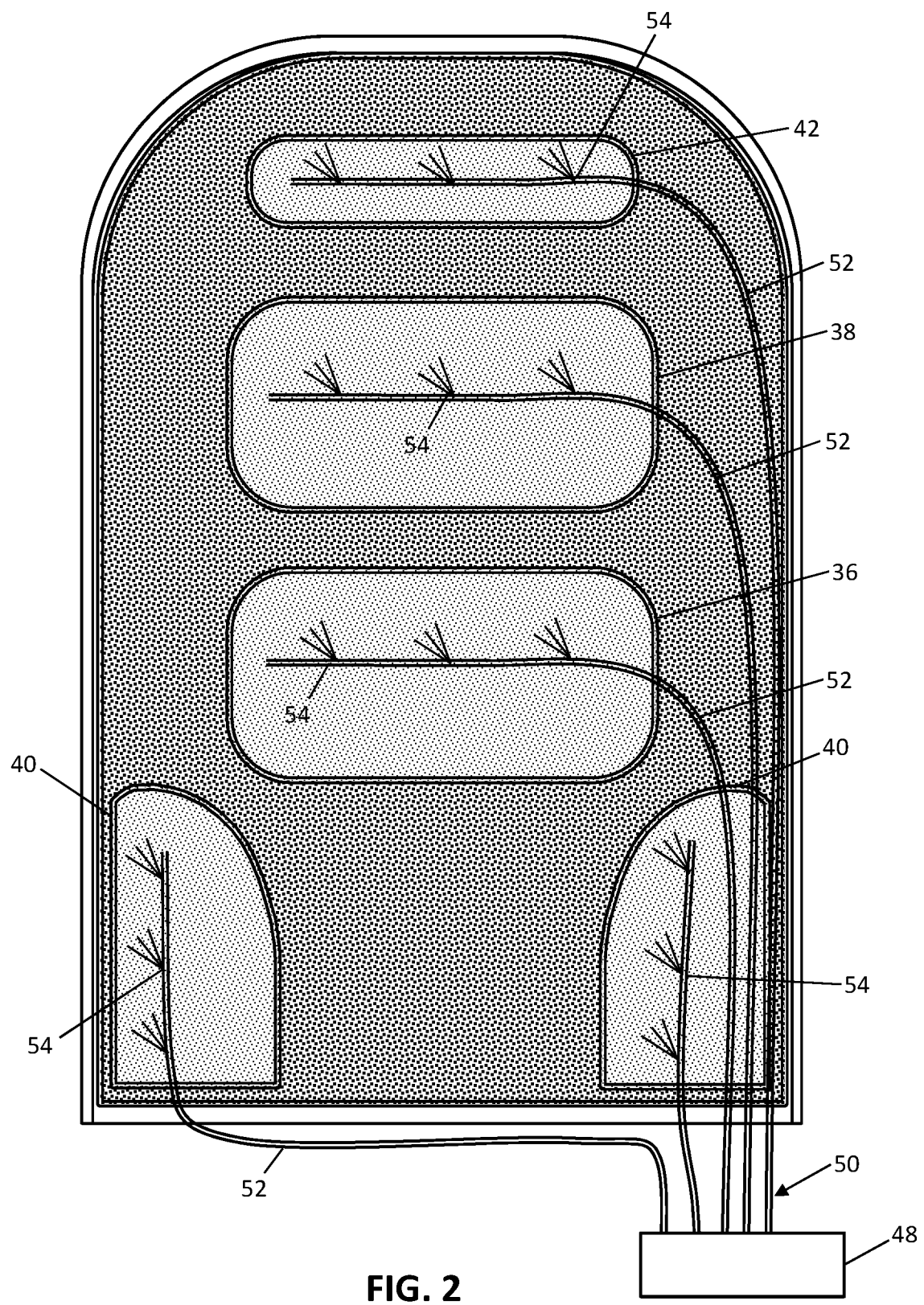
FIG. 2 is a front view of a backrest assembly illustrating ventilated target regions.

Referring to FIG. 2, the conduit network 50 generally includes one or more lengths of air conduit 52, such as flexible air tubing, with each air conduit 52 extending from an outlet port of the air mover assembly 48 into a target region in the cushion assembly. The portions of the air conduits 52 within the target regions are perforated with openings 54 that allow air to flow out of the air conduit and into the target area spacer mesh, and in some embodiments, directed toward a front face of the cushion assembly. In some embodiments, each air conduit 52 is a dedicated run from one outlet port to one target region. In other embodiments, one air conduit 52 may supply an unconditioned flow of air to more than one target region. In yet other embodiments, one air conduit 52 may supply a flow of unconditioned air to a splitter, which in turn supplies multiple flows of unconditioned air to multiple air conduits 52 flowing unconditioned air to one or more target regions. As shown in FIG. 2, air is flowed to each of the lower backrest target region 36, upper backrest target region 38, headrest target region 42, and side bolster target regions 40 by a single air conduit 52. The air conduits 52 may be embedded in the foam and/or spacer mesh or routed between the foam and the backrest element and embedded in the spacer mesh to prevent each air conduit from being displaced with respect to its respective spacer mesh target region.

Figure 3:
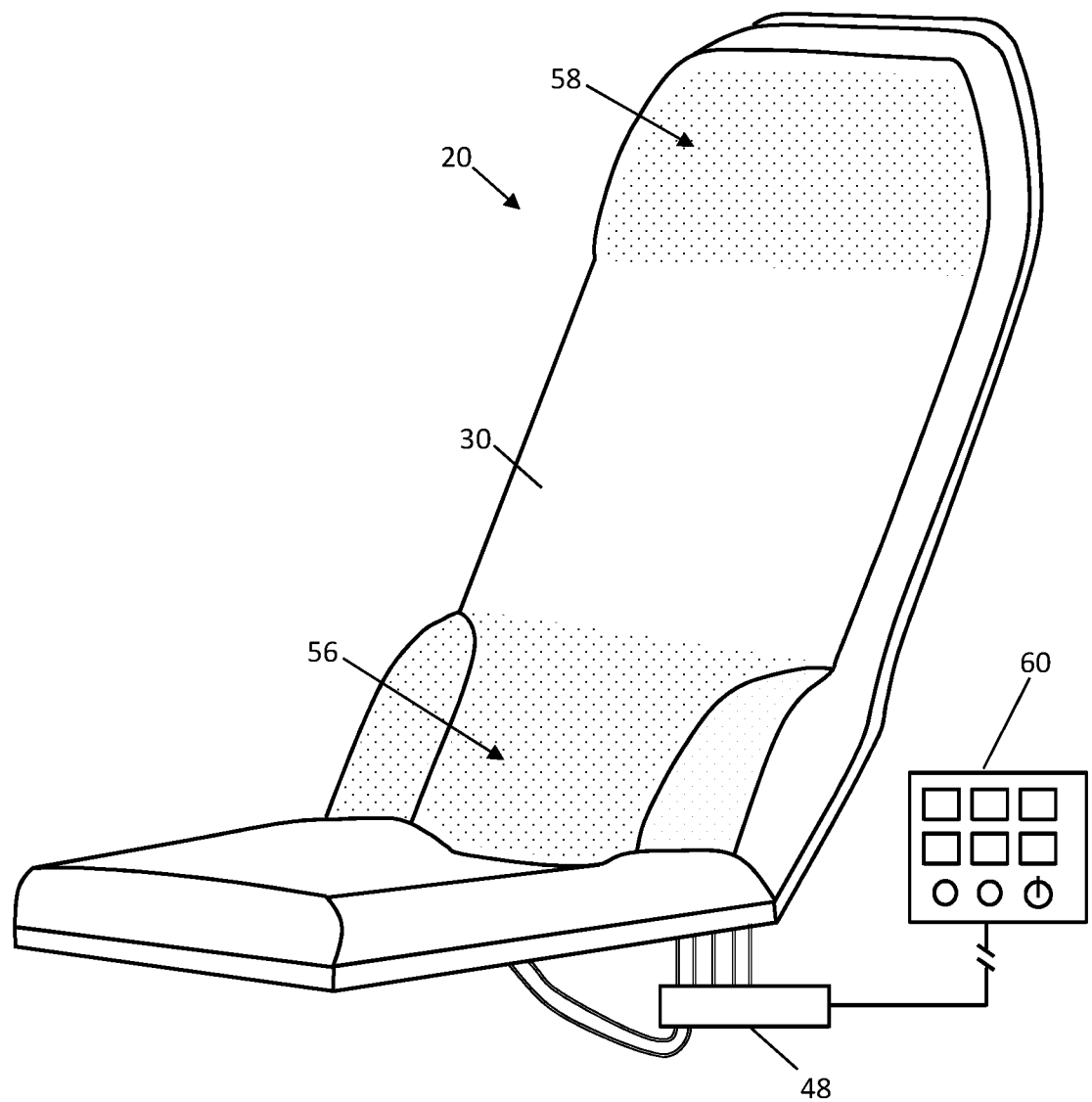
FIG. 3 is a perspective view of a seat assembly illustrating a non-limiting example of predetermined target regions on a perforated dress cover.

Referring to FIG. 3, a non-limiting example of the seat assembly 20 as perceived by the passenger is illustrated. The dress cover 30 is perforated about a lower backrest region 56 and about an upper backrest region 58 to allow air to flow out of the cushion assembly. Spacer mesh and the respective embedded air conduits are positioned in those regions beneath the dress cover, while foam may be positioned outside of those regions beneath the dress cover. To the passenger, the perforations may be perceptible with close inspection, while the underlying ventilation system is not visible nor felt through the dress cover. The controller 60 may be located in proximity to the seat, such as within an armrest along with seat adjustability and media controls.

Figure 4:
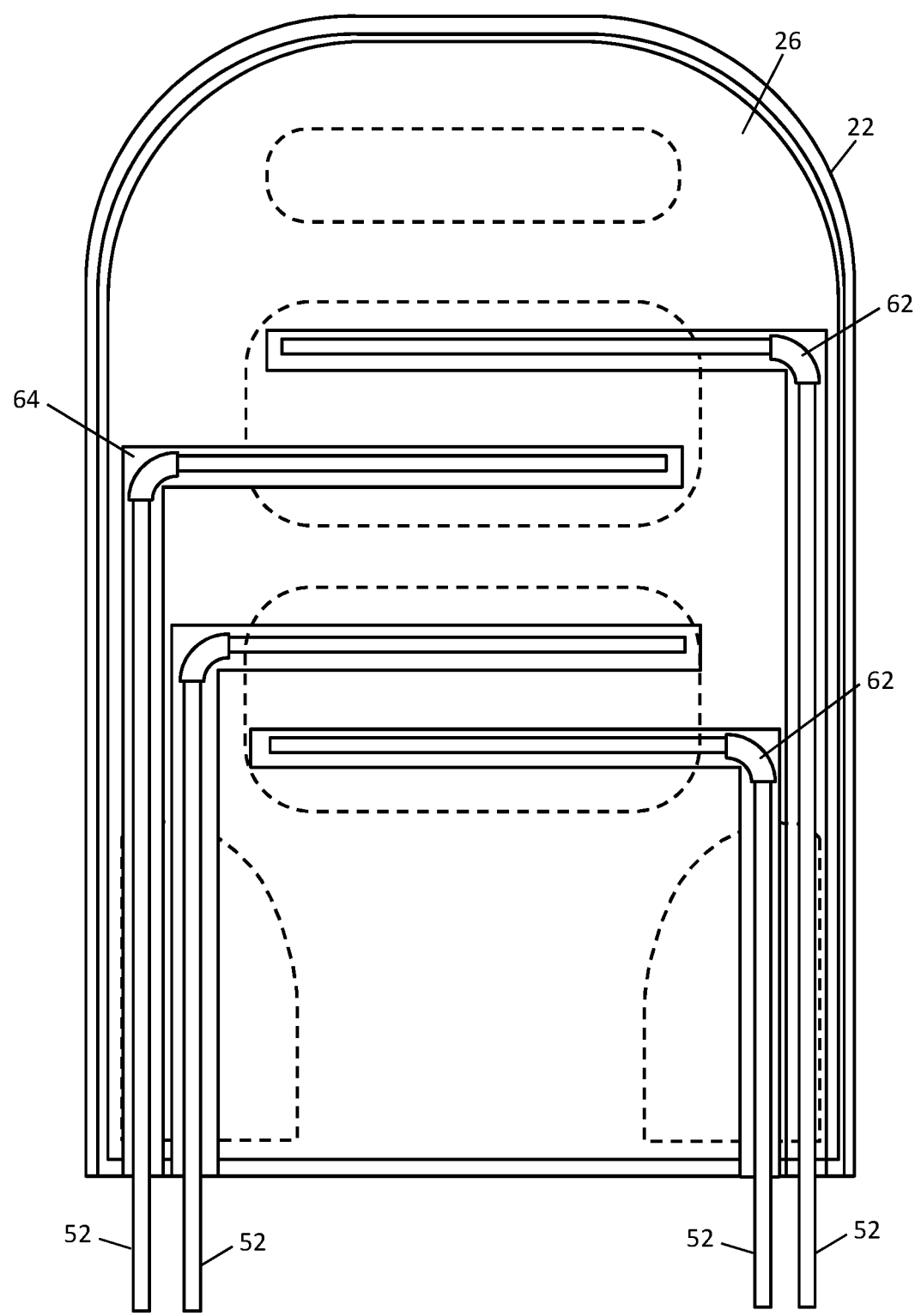
FIG. 4 is a partially deconstructed backrest assembly illustrating air conduit routing through the backrest structural element.

Referring to FIG. 4, a specific seat construction is illustrated. In this seat construction, passages 64 are formed in a frontside of the structural frame element 26 and are recessed from a front planar face of the element. Each passage 64 has a depth corresponding to substantially a thickness of an air conduit 52 routed therethrough. The passages 64 are shaped and directed from an air conduit entry point of the element to a target region in one of the aforementioned target regions, among others. As illustrated, the air conduits 52 are constructed from rigid tubing section joined together with connectors 62 for providing directional changes. Each air conduit 52 may be open at its distal end within the target region and may be provided with openings along its length in the target region to distribute air flow uniformly throughout the respective target region.

Referring again to FIG. 1, a controller 60 is operable for activating the air mover 48 and actuating the optional manifold assembly to cause unconditioned air to flow through the conduit network(s). The controller may be operatively coupled to or an integral part of a passenger seat control interface. The control interface may be located on the seat assembly or in proximity thereto. The control interface may be collocated with the seat control features such that all seat comfort controls are provided in the same passenger device. Ventilation system controls may include, but are not limited to, one or more of activating the air mover, adjusting air mover output, selecting a target region(s) to be ventilated, etc. Each passenger control interface may be networked with a master crew controller capable of overriding each individual seat controller. For example, all ventilation systems may be deactivated during taxi, takeoff and landing and permitted to be selectively activated during flight.

The seat ventilation systems disclosed herein may further include at least one sensor positioned in the seat assembly coupled with the controller 60 and operable for activating the ventilation assembly in response to a sensed condition to provide automatic ventilation in response to exceeding a predetermined threshold condition, such as a predetermined threshold temperature in one of the target regions to automatically and proactively avoid passenger discomfort. Each sensor may be a device or a subsystem capable of detecting condition changes within the seat assembly and with a processor within or in communication with the controller. The system sensors relay information to the processor where processing logic analyzes the data received to control the ventilation system. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide region network (WAN), a local region network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention byway of example only, it is envisioned that other embodiments may perform similar functions and/or achieve similar results. Any and all such equivalent embodiments and examples are within the scope of the present invention and are intended to be covered by the appended claims.

What is claimed is:

1. A ventilated seat assembly with active air circulation, comprising:
   a structural frame element;
   a cushion assembly supported by the structural frame element;
   a perforated dress cover positioned over the cushion assembly;
   a conduit network embedded in the cushion assembly configured to direct air to at least one target region of the cushion assembly;
   an air mover coupled in fluid communication with the conduit network; and
   a controller operable, for activating the air mover to cause air to flow through the conduit network to the at least one target region;
   wherein:
   the cushion assembly is a backrest cushion comprising a spacer mesh component and a foam component and the backrest cushion includes a lower target region positioned proximal to a lumbar region of the backrest and an upper target region positioned proximal to a headrest region of the backrest; and
   the spacer mesh component is positioned in the lower target region and the upper target region and the foam component is positioned outside the lower target region and the upper target region.

2. The ventilated seat assembly of claim 1, wherein the conduit network includes a first length of tubing extending from the air mover to the lower target region and a second length of tubing extending from the air mover to the upper target region, each of the first length of tubing and the second length of tubing having at least one opening for releasing air into their respective target region.

3. The ventilated seat assembly of claim 1, further comprising at least one valve or baffle for controlling air flow through the first length of tubing and the second length of tubing.

4. The ventilated seat assembly of claim 1, wherein the conduit network comprises one or more lengths of tubing routed from the air mover, along passageways defined in the structural frame element, and to a predetermined one of the at least one target region of the cushion assembly, each of the one or more lengths of tubing including openings for releasing air into their respective target region.

5. The ventilated seat assembly of claim 1, wherein the cushion assembly further includes a lumbar target region, a side bolster target region, and a headrest target region, and wherein the conduit network includes a first conduit for delivering air to the lumbar target region, a second conduit for delivering air to the side bolster target region, and a third conduit for delivering air to the headrest target region.

6. The ventilated seat assembly of claim 5, wherein each of the first, second and third conduits comprises a length of tubing having at least one opening positioned in a predetermined target region for releasing air into the predetermined target region.

7. The ventilated seat assembly of claim 1, wherein the air mover serves a single ventilated seat assembly and is positioned below or behind the structural frame element.

8. The ventilated seat assembly of claim 1, wherein the cushion assembly is sealed on at least one side facing away from a passenger contact surface of the cushion assembly.

9. An aircrraft passenger seat assembly, comprising:
a backrest frame element supporting a backrest cushion assembly;
a seat pan supporting a seat bottom cushion assembly;
a first conduit network embedded in the backrest cushion assembly configured to direct air to at least one target region of the backrest cushion assembly;
an air mover coupled in fluid communication with the first conduit network; and
a controller operable for activating the air mover to cause air to flow through the first conduit network to the at least one target region;
wherein the backrest cushion assembly includes a spacer mesh component positioned in a target region of the backrest cushion assembly and a foam component positioned outside of the target region, and the first conduit network includes at least one length of tubing embedded in the spacer mesh component and having at least one opening for releasing air into the target region.

10. The seat assembly of claim 9, further comprising a second conduit network embedded in the seat bottom cushion configured to deliver air to at least one target region of the seat bottom cushion assembly, wherein the second conduit network is coupled in fluid communication with the air mover and the controller is further operable for activating the air mover to cause air to flow through the second conduit network to the at least one target region.

11. The seat assembly of claim 10, wherein activation of the air mover by the controller causes air to flow through the first conduit network and the second conduit network simultaneously.

12. The seat assembly of claim 9, wherein the backrest cushion assembly comprises a lower target region positioned proximal to a lumbar region and an upper target region positioned proximal to a headrest region, and wherein the backrest cushion assembly includes the spacer mesh component positioned in the lower and upper target regions and the foam component positioned outside of the lower and upper target regions.

13. The seat assembly of claim 12, wherein the first conduit network includes a first length of tubing extending from the air mover to the lower target region and a second length of tubing extending from the air mover to the upper target region, each of the first length of tubing and the second length of tubing having at least one opening for releasing region into their respective target region.

14. The seat assembly of claim 10, wherein the first conduit network comprises one or more lengths of tubing routed from the air mover, along passageways defined in the backrest frame element, and to a predetermined one of the at least one target region of the backrest cushion assembly, and wherein the second conduit network comprises one or more lengths of tubing routed from the air mover, along passageways defined in the seat pan, and to a predetermined one of the at least one target region of the seat bottom cushion assembly.

15. The seat assembly of claim 9, wherein the backrest cushion assembly comprises a lumbar target region, a side bolster target region, and a headrest target region, and wherein the first conduit network comprises a first conduit for delivering air to the lumbar target region, a second conduit for delivering air to the side bolster target region, and a third conduit for delivering air to the headrest target region.

16. The seat assembly of claim 9, wherein the air mover serves a single seat assembly and is positioned below the seat pan or behind the backrest frame element.

\* \* \* \* \*